United States Patent
Matsuyama et al.

(10) Patent No.: US 11,858,370 B2
(45) Date of Patent: Jan. 2, 2024

(54) VEHICLE AND METHOD FOR CONTROLLING VEHICLE

(71) Applicant: TOYOTA JIDOSHA KABUSHIKI KAISHA, Toyota (JP)

(72) Inventors: Yoshio Matsuyama, Nisshin (JP); Yugo Mochizuki, Nisshin (JP); Yoshiaki Kawakami, Nagoya (JP); Masataka Ogushi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 784 days.

(21) Appl. No.: 16/739,222

(22) Filed: Jan. 10, 2020

(65) Prior Publication Data
US 2020/0231060 A1   Jul. 23, 2020

(30) Foreign Application Priority Data

Jan. 17, 2019   (JP) .................................. 2019-006196

(51) Int. Cl.
*H02J 7/00* (2006.01)
*B60L 53/62* (2019.01)
*B60L 50/60* (2019.01)
*B60H 1/00* (2006.01)

(52) U.S. Cl.
CPC .......... *B60L 53/62* (2019.02); *B60H 1/00278* (2013.01); *B60L 50/60* (2019.02); *H02J 7/00309* (2020.01); *H02J 7/00041* (2020.01)

(58) Field of Classification Search
CPC .................................................. H02J 7/00309
USPC ................................................... 320/150–154
See application file for complete search history.

(56) References Cited

U.S. PATENT DOCUMENTS

| | | | | |
|---|---|---|---|---|
| 5,555,737 A | * | 9/1996 | Takeo | H02J 7/00714 62/236 |
| 6,281,663 B1 | | 8/2001 | Yagi et al. | |
| 2013/0311017 A1 | * | 11/2013 | Matsunaga | B60L 53/64 701/22 |
| 2016/0301114 A1 | * | 10/2016 | Izumi | B60H 1/00392 |
| 2018/0361872 A1 | | 12/2018 | Zhou | |
| 2021/0194296 A1 | * | 6/2021 | Jo | H02J 50/80 |

(Continued)

FOREIGN PATENT DOCUMENTS

| | | | |
|---|---|---|---|
| JP | 2001-145213 A | | 5/2001 |
| JP | 2010058635 A | * | 3/2010 |
| JP | 2013-169031 A | | 8/2013 |

(Continued)

*Primary Examiner* — Edward Tso
*Assistant Examiner* — Ahmed H Omar
(74) *Attorney, Agent, or Firm* — Sughrue Mion, PLLC

(57) ABSTRACT

A vehicle includes: a battery that is chargeable with electric power supplied from a charger provided outside the vehicle; and an air-conditioning and cooling system that cools the battery. An ECU controls a charging operation for the battery such that the battery is charged under a charging condition of a constant current which is constant over a charging period from start of charging to satisfaction of a completion condition. The ECU sets the charging condition such that a battery temperature when the completion condition is satisfied becomes an upper limit temperature, based on an amount of heat generation in the battery caused by charging and an amount of cooling of the battery by the air-conditioning and cooling system.

1 Claim, 11 Drawing Sheets

(56) References Cited

U.S. PATENT DOCUMENTS

2022/0016958 A1* 1/2022 Komazawa ............. B60L 53/00

FOREIGN PATENT DOCUMENTS

| JP | 2013-247726 A | 12/2013 |
| JP | 2017-184353 A | 10/2017 |

* cited by examiner

VEHICLE AND METHOD FOR CONTROLLING VEHICLE

This nonprovisional application is based on Japanese Patent Application No. 2019-006196 filed on Jan. 17, 2019 with the Japan Patent Office, the entire contents of which are hereby incorporated by reference.

BACKGROUND

Field

The present disclosure relates to a vehicle and a method for controlling a vehicle, and more particularly to the technique of charging a vehicle-mountable power storage device with electric power supplied from outside a vehicle.

Description of the Background Art

In recent years, plug-in hybrid vehicles, electric vehicles and the like have been commercially available. These vehicles are configured such that "external charging" for charging a vehicle-mountable power storage device with electric power supplied from outside a vehicle is possible.

A capacity of a vehicle-mountable power storage device is expected to increase in the future. As a result, an EV traveling distance (distance that can be traveled by a vehicle using electric power stored in the power storage device) of a vehicle can be extended. However, when the charging time becomes excessively long with the increase in capacity of the power storage device, the user's convenience may decrease.

Therefore, in order to shorten the charging time, external charging with electric power (e.g., several hundreds of kW) higher than conventional charging power (e.g., several tens of kW) is under study. Conventional charging is also referred to as "normal charging", and charging with high power is also referred to as "quick charging".

For example, Japanese Patent Laying-Open No. 2017-184353 discloses a charging device that performs quick charging and normal charging during the chargeable time and completes charging to a prescribed charging capacity at the end of the chargeable time, to thereby delay the progress of deterioration of a battery.

SUMMARY

Generally, an upper limit temperature, which is an upper limit of a usage temperature range during external charging, is set for a power storage device. In quick charging, a power loss (Joule heat) produced in the power storage device is higher and a rise in temperature is more likely to occur than in normal charging. Therefore, a vehicle adapted to quick charging is designed to be provided with a cooling device that cools the power storage device.

Depending on a combination of a quick charger and the vehicle, however, when quick charging is performed with a maximum power (or a maximum current corresponding to the maximum power) that can be output from the quick charger, an amount of heat generation in the power storage device caused by charging can far exceed an amount of cooling of the power storage device by the cooling device. Therefore, a rise in temperature of the power storage device speeds up excessively, and the temperature of the power storage device may reach the upper limit temperature before a charging completion condition such as arrival of an SOC (State Of Charge) of the power storage device at a target value is satisfied. Then, a temperature restriction for protecting the power storage device is imposed and a charging current supplied to the power storage device is suppressed to be lower than the maximum current. As a result, the charging time becomes longer, although a further rise in temperature of the power storage device is prevented.

When the charging current supplied to the power storage device is set at the maximum current in order to shorten the charging time as described above, the power loss in the power storage device can become higher, and the charging time can become longer due to suppression of the charging current.

The present disclosure has been made to solve the above-described problem and an object of the present disclosure is to shorten the charging time as much as possible and reduce a power loss caused by external charging.

(1) A vehicle according to an aspect of the present disclosure includes: a power storage device that is chargeable with electric power supplied from an external power supply provided outside the vehicle; a cooling device that cools the power storage device; and a controller. The controller controls a charging operation for the power storage device such that the power storage device is charged under a charging condition of a constant current or a constant power over a charging period from start of charging to satisfaction of a completion condition. The controller sets the charging condition such that a temperature of the power storage device when the completion condition is satisfied becomes an upper limit temperature, based on an amount of heat generation in the power storage device caused by charging and an amount of cooling of the power storage device by the cooling device.

(2) The controller sets the charging condition to be smaller than a maximum current corresponding to a maximum power that can be output from the external power supply, and to be larger than a suppressing current that suppresses a rise in temperature of the power storage device by balancing the amount of heat generation in the power storage device with the amount of cooling of the power storage device.

(3) The controller sets the charging condition to be smaller than a maximum power that can be output from the external power supply, and to he larger than a suppressing power that, suppresses a rise in temperature of the power storage device by balancing the amount of heat generation in the power storage device with the amount of cooling of the power storage device.

Although the details will he described below, by charging the power storage device with the constant current as in (1) to (3) described above, the amount of heat generation (total amount of heat generation during the charging time) in the power storage device can be reduced, as compared with the case of suppressing a charging current (current may be replaced with electric power and the same applies to the following description) supplied to the power storage device from the maximum current during charging (the case of imposing the above-described temperature restriction). In addition, by permitting the rise in temperature of the power storage device to the upper limit temperature, the charging time can be shortened, as compared with the case of imposing the temperature restriction and the case of maintaining the temperature of the power storage device within a temperature range lower than the upper limit temperature. Therefore, according to (1) to (3) described above, it is possible to shorten the charging time as much as possible and reduce a power loss caused by charging.

(4) The cooling device performs an air-conditioning operation for a vehicle cabin of the vehicle, in addition to cooling of the power storage device. The controller calculates the amount of cooling of the power storage device to be larger, thereby setting the constant current or the constant power to be larger, when the air-conditioning operation by the cooling device is not performed than when the air-conditioning operation by the cooling device is performed.

When the air-conditioning operation by the cooling device is performed, the cooling capability (e.g., a flow rate of a refrigerant) of the cooling device must be used both for air-conditioning of the vehicle cabin and for cooling of the power storage device. In contrast, when the air-conditioning operation by the cooling, device is not performed, the cooling capability of the cooling device can be used entirely for cooling of the power storage device. Therefore, the capability of cooling the power storage device by the cooling device is higher when the air-conditioning operation by the cooling device is not performed than when the air-conditioning operation by the cooling device is performed. According to (4) described above, when the air-conditioning operation by the cooling device is not performed, the constant current is calculated to be larger in consideration of an increase in cooling capability of the cooling device, and thus, it is possible to further shorten the charging time.

(5) The vehicle has a plurality of charging modes that can be selected by a user of the vehicle. The controller changes the upper limit temperature in accordance with a charging mode selected by the user.

As the temperature of the power storage device becomes higher, deterioration of the power storage device becomes more likely to progress. Therefore, when the upper limit temperature is set to be relatively low, deterioration of the power storage device becomes less likely to progress, although the charging time becomes longer. Conversely, when the upper limit temperature is set to be relatively high, the charging time becomes shorter, although deterioration of the power storage device becomes more likely to progress. According to (4) described above, the user can select the degree of progress of deterioration of the power storage device and the length of the charging time.

(6) In a method for controlling a vehicle according to another aspect of the present disclosure, the vehicle includes a vehicle-mountable power storage device that is chargeable with electric power supplied from outside the vehicle, and a cooling device that cools the power storage device. The method includes first and second steps. The first step is a step of controlling a charging operation for the power storage device such that the power storage device is charged under a charging condition of a constant current or a constant power over a charging period from start of charging to satisfaction of a completion condition. The second step is a step of setting the charging condition such that a temperature of the power storage device when the completion condition is satisfied becomes an upper limit temperature, based on an amount of heat generation in the power storage device caused by charging and an amount of cooling of the power storage device by the cooling device.

According to (6) described above, it is possible to shorten the charging time as much as possible and reduce a power loss caused by charging, similarly to (1) described above.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
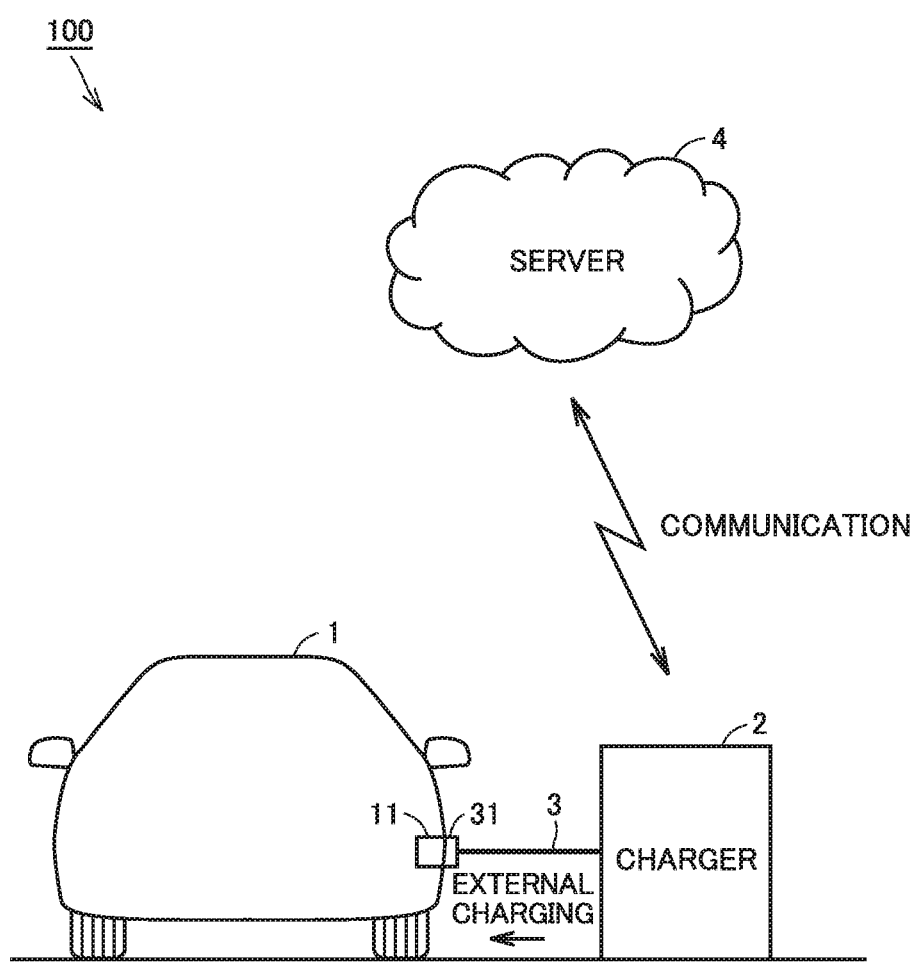
FIG. 1 schematically shows an overall configuration of a charging system according to a first embodiment of the present disclosure.

Embodiments will be described in detail hereinafter with reference to the drawings, in which the same or corresponding portions are denoted by the same reference characters and description thereof will not be repeated.

First Embodiment

<Overall Configuration of Charging System>

FIG. 1 schematically shows an overall configuration of a charging system according to a first embodiment of the present disclosure. Referring to FIG. 1, a charging system 100 includes a vehicle 1, a charger 2, a charging cable 3, and a server 4. FIG. 1 shows a situation in which external charging by charger 2 is performed on vehicle 1. During external charging, vehicle 1 and charger 2 are electrically connected by charging cable 3.

Vehicle 1 is, for example, an electric vehicle. However, vehicle 1 may be, for example, a plug-in hybrid vehicle as long as vehicle 1 is a vehicle configured such that external charging is possible. Charger 2 is, for example, a quick charger provided in a public charging station. In the present embodiment, a system of being charged in accordance with an amount of electric power (amount of charging) supplied from charger 2 is mainly assumed. Charger 2 corresponds to "external power supply" according to the present disclosure.

Server 4 includes a CPU (Central Processing Unit), a memory and an input/output port, although all are not shown. Server 4 determines an amount of money charged for external charging by charger 2. Charger 2 and server 4 perform wireless bidirectional communication. Server 4 is not an essential component for charging system 100.

Figure 2:
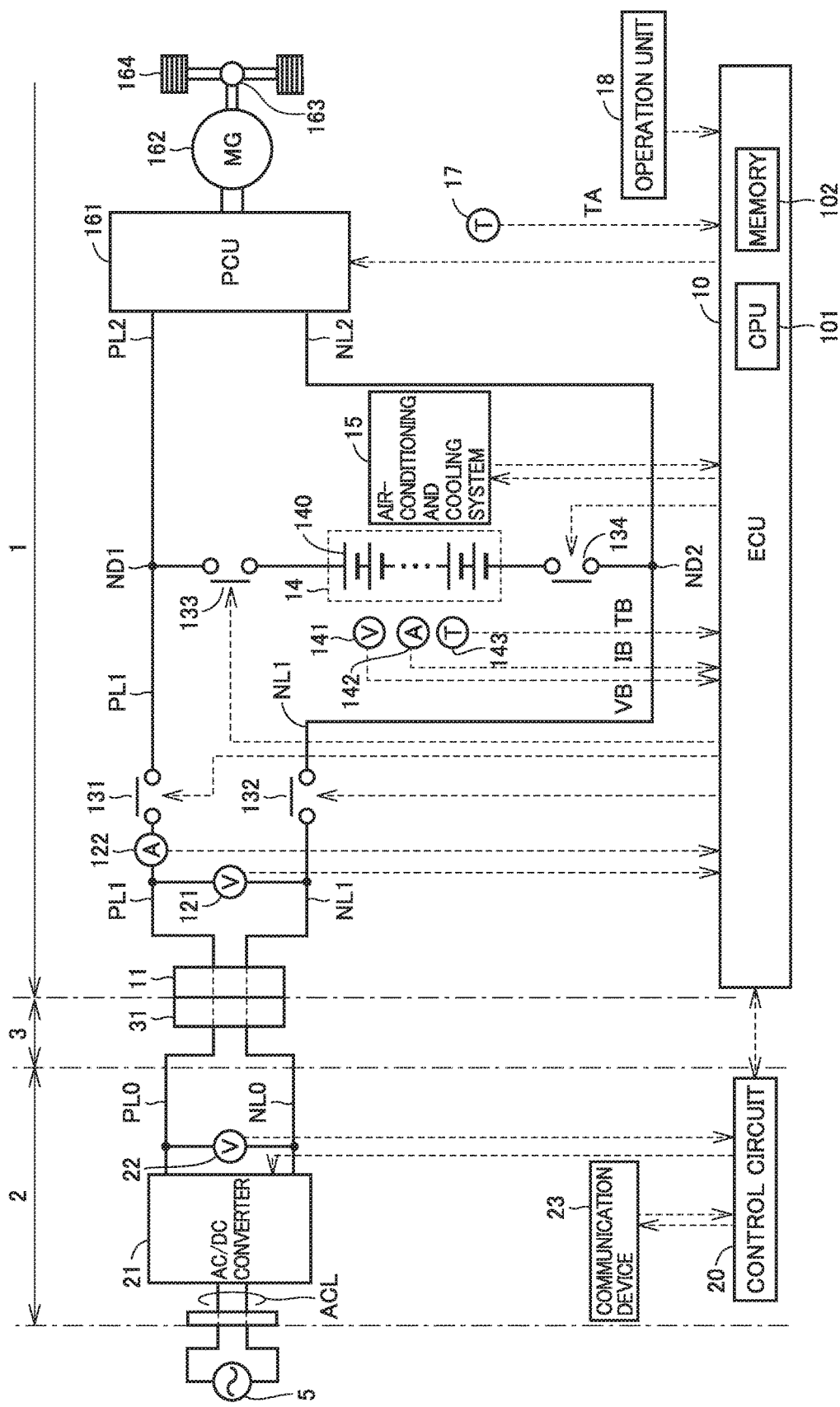
FIG. 2 is a block diagram schematically showing a configuration of a vehicle and a charger.

FIG. 2 is a block diagram schematically showing a configuration of vehicle 1 and charger 2. Referring to FIG. 2, charger 2 is a direct current (DC) charger and converts electric power (AC power) supplied from system power supply 5 into charging power (DC power) of a battery 14 mounted on vehicle 1. Charger 2 includes a power line ACL, an AC/DC converter 21, a voltage sensor 22, power feeding lines PL0 and NL0, a communication device 23, and a control circuit 20.

Power line ACL is electrically connected to system power supply 5. Power line ACL transmits the AC power supplied from system power supply 5 to AC/DC converter 21.

AC/DC converter 21 converts the AC power on power line ACL into the DC power for charging battery 14 mounted on vehicle 1. The power conversion by AC/DC converter 21 may be performed by a combination of AC/DC conversion for power factor improvement and DC/DC conversion for voltage level adjustment. The DC power output from AC/DC converter 21 is supplied by power feeding line PL0 on the positive electrode side and power feeding line NL0 on the negative electrode side.

Voltage sensor 22 is electrically connected between power feeding line PL0 and power feeding line NL0. Voltage sensor 22 detects a voltage between power feeding line PL0 and power feeding line NL0, and outputs the result of detection to control circuit 20.

Communication device 23 performs wireless communication with server 4 (see FIG. 1). Communication device 23 communicates, between charger 2 and server 4, various types of information (such as an amount of charging or the charging time) for determining the amount of money charged for external charging.

Control circuit 20 includes a CPU, a memory and an input/output port (all are not shown). Control circuit 20 controls the power conversion operation by AC/DC converter 21, based on the voltage detected by voltage sensor 22, a signal provided from vehicle 1, and a map and a program stored in the memory. Control circuit 20 also controls communication device 23 such that communication between charger 2 and server 4 is achieved.

Vehicle 1 includes an inlet 11, charging lines PL1 and NL1, a voltage sensor 121, a current sensor 122, charging relays 131 and 132, system main relays (SMRs) 133 and 134, battery 14, an air-conditioning and cooling system 15, power lines PL2 and NL2, a PCU (Power Control Unit) 161, a motor generator 162, a motive power transmission gear 163, a driving wheel 164, an outdoor air temperature sensor 17, an operation unit 18, and an ECU (Electronic Control Unit) 10.

A connector 31 of charging cable 3 is inserted into inlet (charging port) 11, with mechanical coupling such as fitting. The insertion of connector 31 ensures electrical connection between power feeding line PL0 and a positive-electrode-side contact point of inlet 11, and ensures electrical connection between power feeding line NL0 and a negative-electrode-side contact point of inlet 11. In addition, when inlet 11 and connector 31 are connected by charging, cable 3, ECU 10 of vehicle 1 and control circuit 20 of charger 2 can mutually exchange various types of signals, commands and information (data) by communication in accordance with communication standards such as CAN (Controller Area Network) or communication using an analog signal through an analog control line.

Voltage sensor 121 is electrically connected on the inlet 11 side relative to charging relays 131 and 132 and between, charging line PL1 and charging line NL1. Voltage sensor 121 detects a DC voltage between charging line PL1 and charging line NL1, and outputs the result of detection to ECU 10. Current sensor 122 is provided on charging line PL1. Current sensor 122 detects a current flowing through charging line PL1, and outputs the result of detection to ECU 10. ECU 10 can also calculate the electric power (amount of charging of battery 14) supplied from charger 2, based on the results of detection by voltage sensor 121 and current sensor 122.

Charging relay 131 is connected to charging line PL1, and charging relay 132 is connected to charging line NL1. Closing and opening of charging relays 131 and 132 are controlled in accordance with a command provided from ECU 10. When charging relays 131 and 132 are closed and SMRs 133 and 134 are closed, electric power transmission between inlet 11 and battery 14 becomes possible.

Battery 14 supplies electric power for generating driving force of vehicle 1. Battery 14 also stores electric power generated by motor generator 162. Battery 14 is an assembled battery including a plurality of cells 140. Each cell 140 is a secondary battery such as a lithium ion secondary battery or a nickel-metal hydride secondary battery. In the present embodiment, an internal configuration of the assembled battery does not matter, and thus, cell 140 is not particularly mentioned below and the term "battery 14" is simply used. Battery 14 corresponds to "power storage device" according to the present disclosure. Instead of battery 14, a capacitor such as an electric double layer capacitor may be used.

A positive electrode of battery 14 is electrically connected to a node ND1 with SMR 133 being interposed. Node ND1 is electrically connected to charging line PL1 and power line PL2. Similarly, a negative electrode of battery 14 is electrically connected to a node ND2 with SMR 134 being interposed. Node ND2 is electrically connected to charging line NL1 and power line NL2. Closing and opening of SMRs 133 and 134 are controlled in accordance with a command provided from ECU 10.

Battery 14 is provided with a voltage sensor 141, a current sensor 142 and a battery temperature sensor 143. Voltage sensor 141 detects a voltage VB of battery 14. Current sensor 142 detects a current IB input to and output from battery 14. Battery temperature sensor 143 detects a temperature TB of battery 14 (hereinafter, also referred to as "battery temperature TB"). Each sensor outputs the result of detection to ECU 10. ECU 10 can calculate the SOC of battery 14 based on the result of detection by voltage sensor 141 and/or current sensor 142. ECU 10 can also determine whether or not battery 14 has reached an overheated state (state in which an upper limit temperature UL described below is exceeded), based on the result of detection by battery temperature sensor 143.

Air-conditioning and cooling system 15 air-conditions a vehicle cabin in accordance with a command provided from ECU 10. Air-conditioning and cooling system 15 air-conditions the vehicle cabin such that a vehicle cabin temperature $T_{cab}$ comes close to a temperature (set temperature) $T_{set}$ set by user operation. Air-conditioning and cooling system 15 also cools battery 14 in accordance with a command provided from ECU 10. The detailed configuration of air-conditioning and cooling system 15 will be described with reference to FIG. 3.

PCU 161 is electrically connected between power lines PL2 and NL2 and motor generator 162. PCU 161 includes a converter and an inverter (both are not shown), and drives motor generator 162 in accordance with a command provided from ECU 10, Motor generator 162 is an AC rotating electric machine and is, for example, a permanent magnet-type synchronous motor including a rotor in which a permanent magnet is embedded. The output torque of motor generator 162 is transmitted to driving wheel 164 through motive power transmission gear 163, to thereby cause vehicle 1 to travel.

During braking, operation of vehicle 1, motor generator 162 can generate electric power by the rotational force of driving wheel 164. The electric power generated by motor generator 162 is converted into the charging power of battery 14 by PCU 161.

Outdoor air temperature sensor 17 detects an outdoor air temperature TA of vehicle 1, and outputs the result of detection to ECU 10.

Operation unit 18 includes a switch, a display with a touch panel, and the like, and accepts various types of user operations for air-conditioning of the vehicle cabin and external charging. By operating operation unit 18, the user can input set temperature $T_{set}$ of air-conditioning and cooling system 15. In addition, by operating operation unit 18, the user can input the SOC (a target value TAG of the SOC described below) of battery 14 at which external charging is completed, the end time of external charging, the amount of money charged for external charging, and the like. Instead of operation unit 18, the user operation about external charging may be performed by a mobile terminal (such as a smartphone) of the user, or may be performed by an operation, button provided on charger 2.

Similarly to control circuit 20, ECU 10 includes a CPU 101, a memory 102 such as a ROM (Read Only Memory) and a RAM (Random Access Memory), and an input/output port (not shown). In accordance with a signal provided from each sensor and the like, ECU 10 controls the devices such that vehicle 1 takes a desired state. Examples of main control performed by ECU 10 include external charging control for charging vehicle-mountable battery 14 with electric power supplied from charger 2. The external charging control is performed in response to the signals, the commands and the information mutually exchanged between ECU 10 of vehicle 1 and control circuit 20 of charger 2 through charging cable 3. The external charging control will be described in detail below.

<Configuration of Air-Conditioning and Cooling System>

Figure 3:
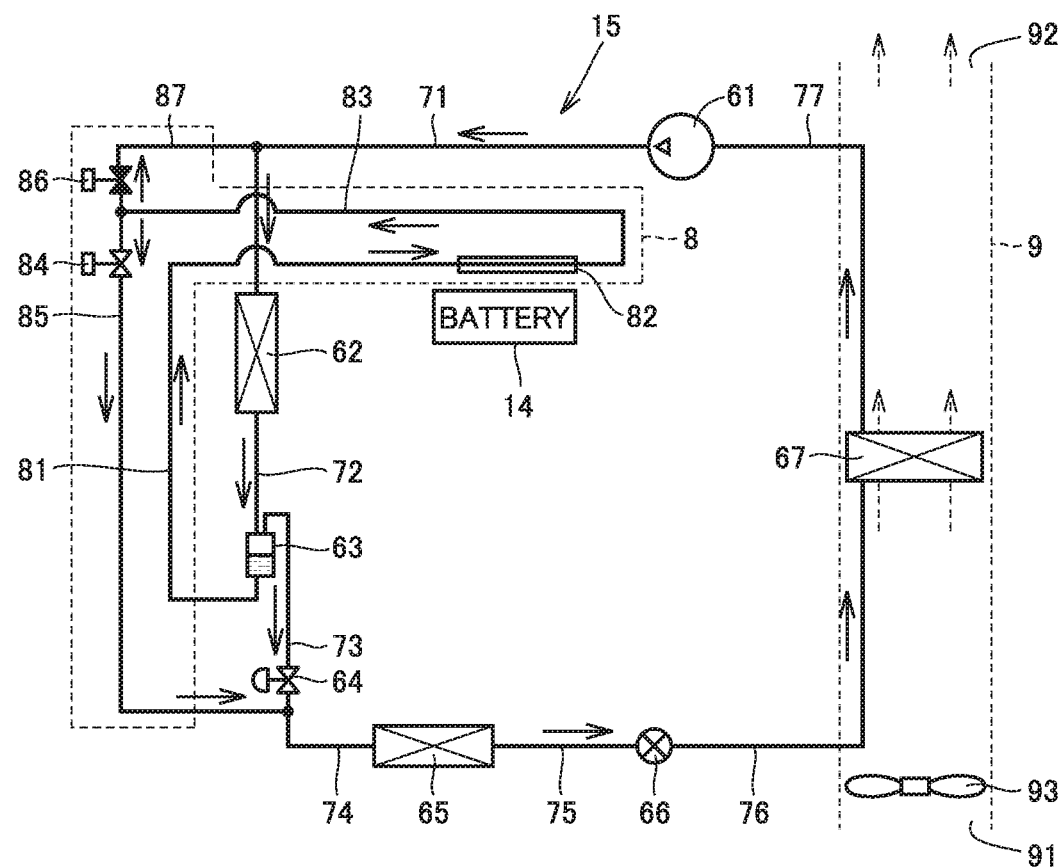
FIG. 3 schematically shows an example configuration of a cooling system.

FIG. 3 schematically shows an example configuration of air-conditioning and cooling system 15. Referring to FIG. 3, air-conditioning and cooling system 15 in the present embodiment is a heat pump system and includes a compressor 61, a heat exchanger 62, a gas-liquid separator 63, a flow rate adjusting valve 64, a heat exchanger 65, an expansion valve 66, a heat exchanger 67, and refrigerant passages 71 to 77 that allow these devices to communicate with each other.

Compressor 61 is provided between refrigerant passage 77 and refrigerant passage 71. Compressor 61 adiabatically compresses a refrigerant gas flowing in from heat exchanger 67 and discharges the high-temperature and high-pressure gas-phase refrigerant to refrigerant passage 71.

Heat exchanger 62 is provided between refrigerant passage 71 and refrigerant passage 72. Heat exchanger 62 isobarically dissipates heat of the superheated gas-phase refrigerant compressed by compressor 61 to the outside. The refrigerant flowing out from heat exchanger 62 is in a wet vapor state in a gas-liquid two-phase state in which a saturated liquid and a saturated vapor are mixed, and is supplied through refrigerant passage 72 to gas-liquid separator 63.

Gas-liquid separator 63 is provided between refrigerant passage 72 and refrigerant passage 73. Gas-liquid separator 63 separates the refrigerant in a gas-liquid two-phase state flowing in from heat exchanger 62 into a gas-phase refrigerant and a liquid-phase refrigerant. The gas-phase refrigerant flows through refrigerant passage 73 to flow rate adjusting valve 64.

Flow rate adjusting valve 64 is provided between refrigerant passage 73 and refrigerant passage 74. Flow rate adjusting valve 64 increases and decreases a pressure loss of the refrigerant flowing through refrigerant passage 73, by changing the degree of opening. As a result, a flow rate of the refrigerant flowing through refrigerant passage 73 and a flow rate of the refrigerant flowing through a cooling system 8 (described below) of battery 14 are adjusted.

Heat exchanger 65 is provided between refrigerant passage 74 and refrigerant passage 75. Heat exchanger 65 cools the refrigerant flowing through refrigerant passage 74 (as described below, the refrigerant that is partially vaporized to take a wet vapor state as a result of heat exchange with battery 14) by heat exchange with the outdoor air. As a result, the refrigerant condenses again and is supplied through refrigerant passage 75 to expansion valve 66.

Expansion valve 66 is provided between refrigerant passage 75 and refrigerant passage 76. Expansion valve 66 expands the high-pressure liquid refrigerant flowing through refrigerant passage 75 to the low-temperature and low-pressure misty refrigerant. As a result, the refrigerant is decompressed to the wet vapor in a gas-liquid mixed state, which is supplied to heat exchanger 67.

Heat exchanger 67 is provided between refrigerant passage 76 and, refrigerant passage 77, and is arranged in a duct 9 for air-conditioning the vehicle cabin. Duct 9 has an inlet 91 through which the air-conditioning air flows in, and an outlet 92 through which the air-conditioning air flows out. A fan 93 is arranged in duct 9. When fan 93 is driven, the air-conditioning air flows through duct 9 from inlet 91 toward outlet 92. Heat exchanger 67 absorbs heat of the air-conditioning air when the refrigerant in the wet vapor state is vaporized. The air-conditioning air having a temperature decreased accordingly is again returned to the vehicle cabin, to thereby cool the vehicle cabin. The refrigerant is heated as a result of endotherm from the air-conditioning air. The vaporized refrigerant is returned to compressor 61 through refrigerant passage 77.

Air-conditioning and cooling system 15 further includes cooling system 8 of battery 14. Cooling system 8 of battery 14 includes a refrigerant passage 81, a heat exchanger 82, a refrigerant passage 83, a switching valve 84, a refrigerant passage 85, a switching valve 86, and a refrigerant passage 87.

Refrigerant passage 81 is coupled to an end at which the liquid-phase refrigerant exits from gas-liquid separator 63. The liquid-phase refrigerant is supplied through refrigerant passage 81 to heat exchanger 82.

Heat exchanger 82 is provided between refrigerant passage 81 and refrigerant passage 83. Heat exchanger 82 is made of a material such as metal having high thermal conductivity, and performs heat exchange between the refrigerant flowing from refrigerant passage 81 to refrigerant passage 83 and battery 14. The refrigerant subjected to heat exchange with battery 14 flows through refrigerant passage 83 to switching valves 84 and 86.

Switching valve 84 is provided between refrigerant passage 83 and refrigerant passage 85. Switching valve 84 switches a communicating, state between refrigerant passage 83 and refrigerant passage 85. Switching valve 86 is provided between refrigerant passage 83 and refrigerant passage 87. Switching valve 86 switches a communicating state between refrigerant passage 83 and refrigerant passage 87.

Switching valves 84 and 86 and flow rate adjusting valve 64 are used to switch a flow path of the refrigerant. During cooling operation by air-conditioning and cooling system 15, switching valve 84 is fully opened, switching valve 86 is fully closed, and the degree of opening of flow rate adjusting valve 64 is adjusted such that a sufficient amount of the refrigerant flows through battery 14. When the degree of opening of flow rate adjusting valve 64 is made higher, a flow rate of the refrigerant flowing through refrigerant passage 81 becomes relatively lower than a flow rate of the refrigerant flowing through refrigerant passage 74, and thus, the capability of cooling battery 14 decreases. In contrast, when the degree of opening of flow rate adjusting valve 64 is made smaller, the flow rate of the refrigerant flowing through refrigerant passage 81 becomes relatively higher than the flow rate of the refrigerant flowing through refrigerant passage 74, and thus, the capability of cooling battery 14 increases. As described above, in air-conditioning and cooling system 15, the flow rate of the refrigerant flowing to heat exchanger 82 can be adjusted and the capability of cooling battery 14 can be adjusted, depending on the situation of vehicle I.

The configuration in which the common refrigerant is used for cooling of battery 14 and for air-conditioning of the vehicle cabin as shown in FIG. 3 is merely one example of air-conditioning and cooling system 15. A cooling system designed specifically for cooling of battery 14 may be provided. In addition, it is not essential that air-conditioning and cooling system 15 should be of liquid cooling type, and air-conditioning and cooling system 15 may be of air cooling type.

<External Charging Control in Comparative Example>

During external charging of vehicle 1, Joule heat corresponding to the magnitude of charging current IB supplied to battery 14 is generated as a power loss. In quick charging, a power loss produced in battery 14 is higher and a rise in temperature is more likely to occur than in normal charging. Therefore, particularly in quick charging, it is desirable to shorten the charging time as much as possible and reduce the power loss caused by external charging. In order to facilitate understanding of the external charging control in the present embodiment, external charging control in a comparative example will be first described below.

Figure 4:
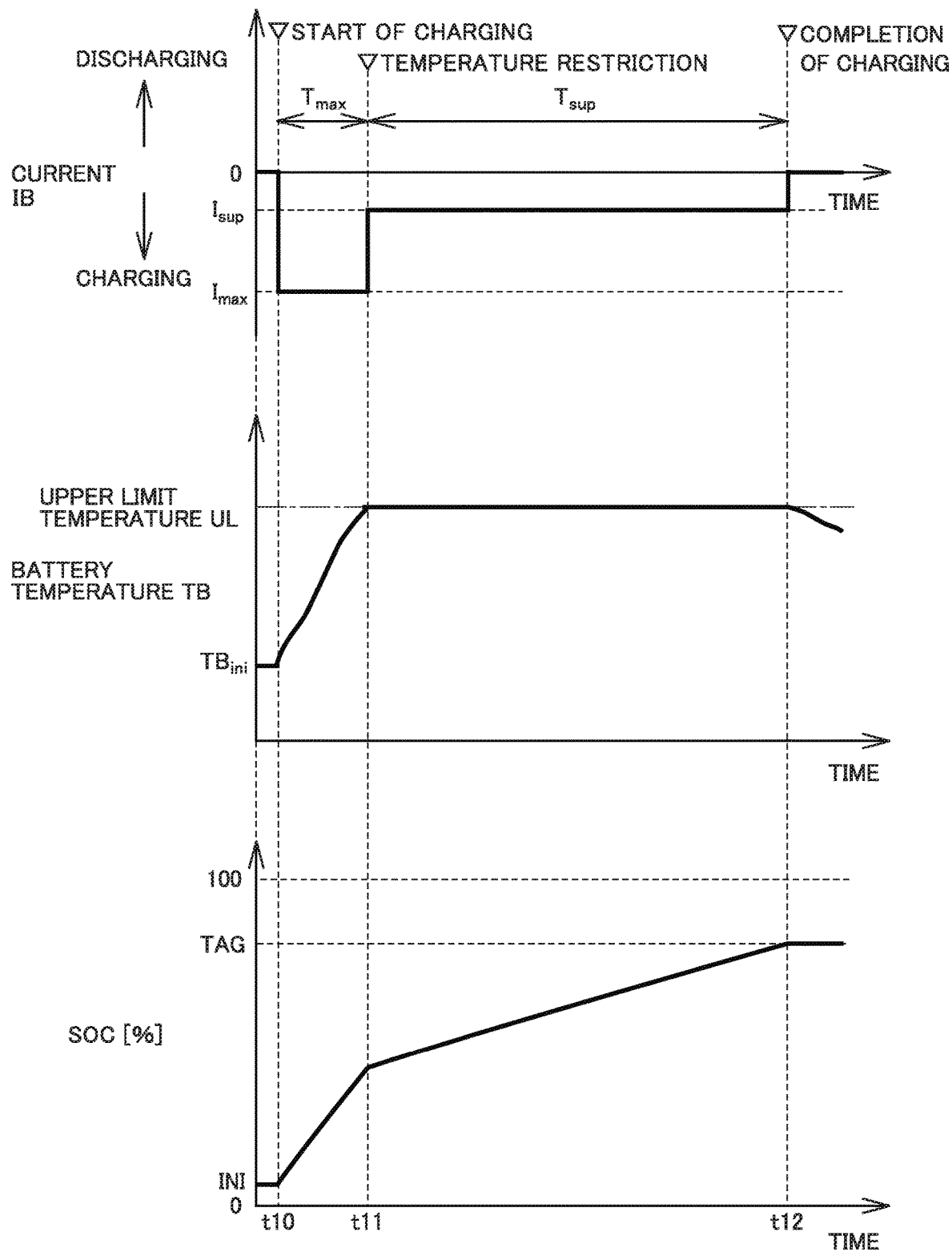
FIG. 4 is a time chart showing an example of external charging control in a comparative example.

FIG. 4 shows an example of the external charging control in the comparative example. In FIG. 4 and FIGS. 5, 10 and 11 described below, the horizontal axis represents the elapsed time. The vertical axis represents, from top to bottom, charging current IB supplied to battery 14, battery temperature TB, and the SOC of battery 14.

Referring to FIG. 4, upper limit temperature UL, which is an upper limit of a usage temperature range of battery 14, is set for battery 14. In addition, an initial value of the SOC of battery 14 is INI, and a target value of the SOC of battery 14 is set at TAG by user operation. When the SOC of battery 14 reaches target value TAG, a charging completion condition is satisfied.

In the comparative example, at time t10, external charging is started with a maximum current $I_{max}$ corresponding to a maximum power $W_{max}$ that can be output from charger 2. Then, an amount of heat generation in battery 14 caused by external charging far exceeds an amount of cooling of battery 14 by air-conditioning and cooling system 15, and battery temperature TB rises rapidly. Before the SOC of battery 14 reaches target value TAG from initial value INI, battery temperature TB reaches upper limit temperature UL at time t11. Then, a temperature restriction for protecting battery 14 is imposed and charging current IB is suppressed to be lower than maximum current $I_{max}$. This current is referred to as "suppressing current $I_{sup}$". Suppressing current $I_{sup}$ prevents a further rise in battery temperature TB by balancing the amount of heat generation in battery 14 with the amount of cooling of battery 14. Thereafter, the SOC of battery 14 rises gradually and reaches target value TAG at time t12, and charging is completed (the charging completion condition is satisfied). A charging period with maximum current $I_{max}$ is denoted as $T_{max}$, and a charging period with suppressing current $I_{sup}$ is denoted as $T_{sup}$.

As described above, in the comparative example, charging current IB supplied to battery 14 is set at maximum current $I_{max}$ at the start of charging, in order to shorten the charging time. In charging with maximum current $I_{max}$, the amount of heat generation is very large. Therefore, battery temperature TB can reach upper limit temperature UL rapidly and charging with maximum current $I_{max}$ can be impossible until the SOC of battery 14 reaches target value TAG. In order to protect battery 14, it is required to strictly restrict a further rise in battery temperature TB having already reached upper limit temperature UL, and thus, charging current IB must be significantly suppressed from maximum current $I_{max}$ to suppressing current $I_{sup}$. As a result, the charging time can become longer.

<External Charging Control in Present Embodiment>

Figure 5:
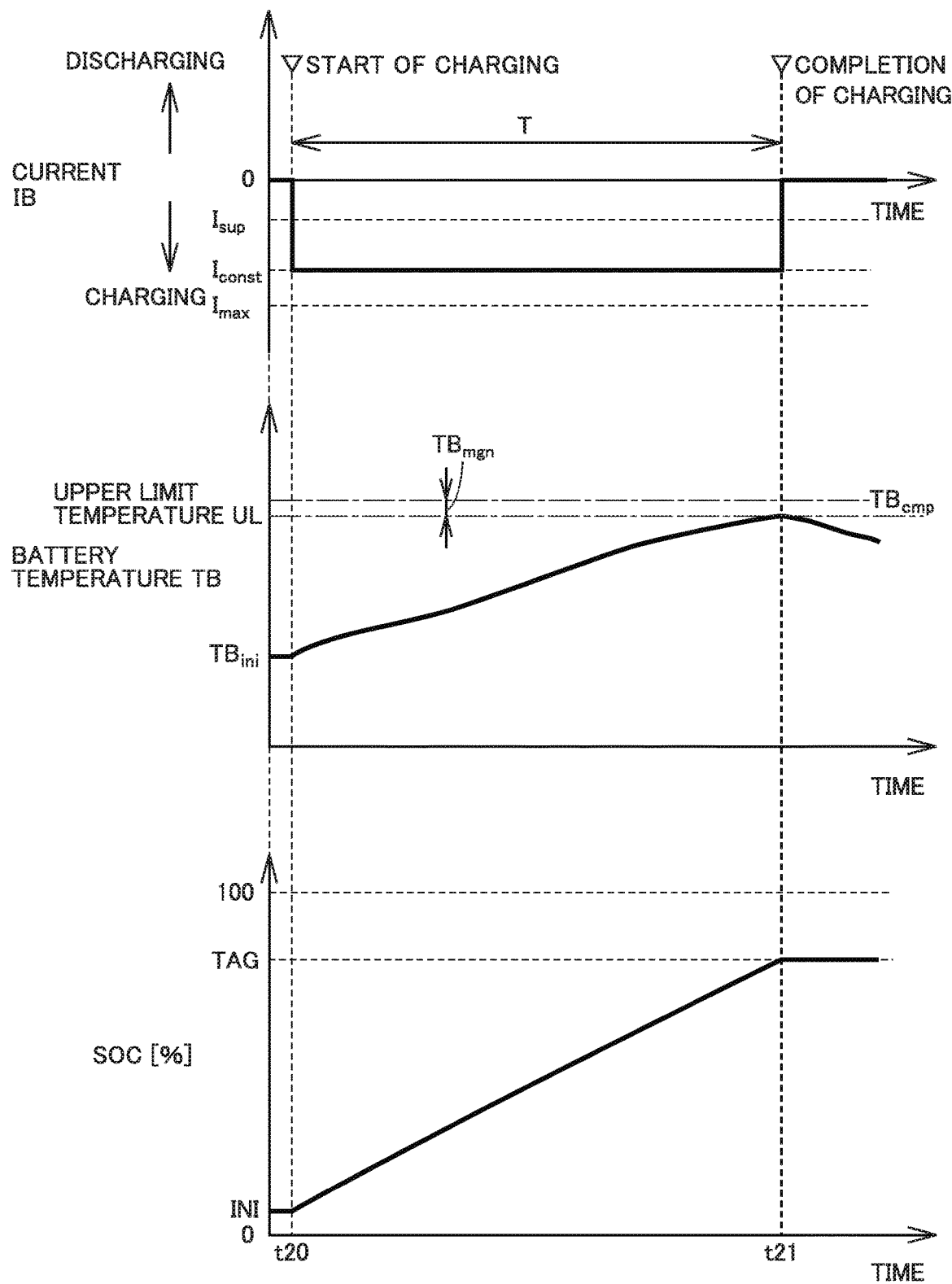
FIG. 5 is a time chart showing an example of external charging control in the first embodiment.

FIG. 5 shows an example of the external charging control in the first embodiment. Referring to FIG. 5, in the present embodiment, charging current IB is controlled to be a constant current value over a charging period from the start of charging (time t20) to satisfaction of the charging completion condition (time t21). This current is referred to as "constant current $I_{const}$". An absolute value of constant current $I_{const}$ is smaller than an absolute value of maximum current $I_{max}$ and is larger than an absolute value of suppressing current $I_{sup}$.

In order to protect battery 14, constant current $I_{const}$ is set such that battery temperature TB is constantly lower than upper limit temperature UL until satisfaction of the charging completion condition (time t21) at which the SOC of battery 14 reaches target value TAG. In addition, in order to shorten the charging time, constant current $I_{const}$ is set such that battery temperature TB when the charging completion condition is satisfied becomes upper limit temperature UL.

"Battery temperature TB becomes upper limit temperature UL" may include the case in which battery temperature TB sufficiently comes close to upper limit temperature UL. More specifically, as battery temperature TB is increased to come closer to upper limit temperature UL, the time required for external charging can be shortened. However, when battery temperature TB matches with upper limit temperature UL, battery temperature TB can reach upper limit temperature UL before the charging completion condition is satisfied and the temperature restriction described in the comparative example can be imposed (also refer to the process in S6 of FIG. 6 described below), due to internal factors such as an estimation error of a time change in battery temperature TB or external factors such as an unexpected rise in outdoor air temperature TA. Therefore, a battery temperature $TB_{cmp}$ when the charging completion condition is satisfied can be set at a value having a predefined margin $TB_{mgn}$ (e.g., several degree C. to some dozen degree C.) with respect to upper limit temperature UL (refer to the following equation (1)). When battery temperature TB falls within margin $TB_{mgn}$, it can be said that "battery temperature TB is upper limit temperature UL" is satisfied. However, it is not essential to set margin $TB_{mgn}$.

$$TB_{cmp} = UL - TB_{mgn} \quad (1)$$

Next, a reason why the power loss in battery 14 caused by external charging can be reduced by charging battery 14 with constant current $I_{const}$ will be described. Generally, an absolute inequality indicated by the following equation (2) holds between an arithmetic mean and a geometric mean of two positive numbers a and b. An equal sign is satisfied and the arithmetic mean on the left side, (a+b)/2, is minimized in this absolute inequality when two positive numbers a and b are equal to each other (a=b).

$$(a+b)/2 \geq \sqrt{(ab)} \qquad (2)$$

For the sake of simplicity, approximation is made when an internal resistance (electrical resistance) $R_E$ of battery 14 is invariable during a time period of external charging. Under this approximation, a total amount of heat generation (total amount of power loss) over an entire time period of external charging ($T_{max}+T_{sup}$) in the comparative example is calculated as ($I_{max}^2 R_E T_{max}+I_{sup}^2 R_E T_{sup}$). In the present embodiment, in the above-described equation (2), an amount of heat generation during a time period $T_{max}$ ($I_{max}^2 R_E T_{max}$) is substituted into positive number a, and an amount of heat generation during a time period $T_{sup}$ ($I_{sup}^2 R_E T_{sup}$) is substituted into positive number b. Then, the following equation (3) is derived from the absolute inequality indicated by the above-described equation (2):

$$I_{max}^2 R_E T_{max}+I_{sup}^2 R_E T_{sup} \geq 2 I_{max} I_{sup} R_E \sqrt{(T_{max} T_{sup})} \qquad (3).$$

The left side of the equation (3), i.e., a total amount of heat generation over an entire charging period ($T_{max}+T_{sup}$), is minimized when an equal sign is satisfied between the amount of heat generation during time period $T_{max}$ ($I_{max}^2 R_E T_{max}$) and the amount of heat generation during time period $T_{sup}(I_{sup}^2 R_E T_{sup})(I_{max}^2 T_{max}=I_{sup}^2 T_{sup})$.

Performing external charging with constant current $I_{const}$ over the entire charging period ($T_{max}+T_{sup}$) as in the present embodiment is equal to setting $I_{max}=I_{sup}$ and $T_{max}=T_{sup}$ in the comparative example (see FIG. 4). Therefore, in the present embodiment, an equal sign in the equation (3) is satisfied. Thus, according to the present embodiment, the total amount of heat generation over the entire charging period ($T_{max}+T_{sup}$) can be minimized. Furthermore, charging current IB does not need to be significantly suppressed from maximum current $I_{max}$ to suppressing current $I_{sup}$, and thus, it is also possible to prevent the charging time from becoming longer.

<External Charging Control Flow>

Figure 6:
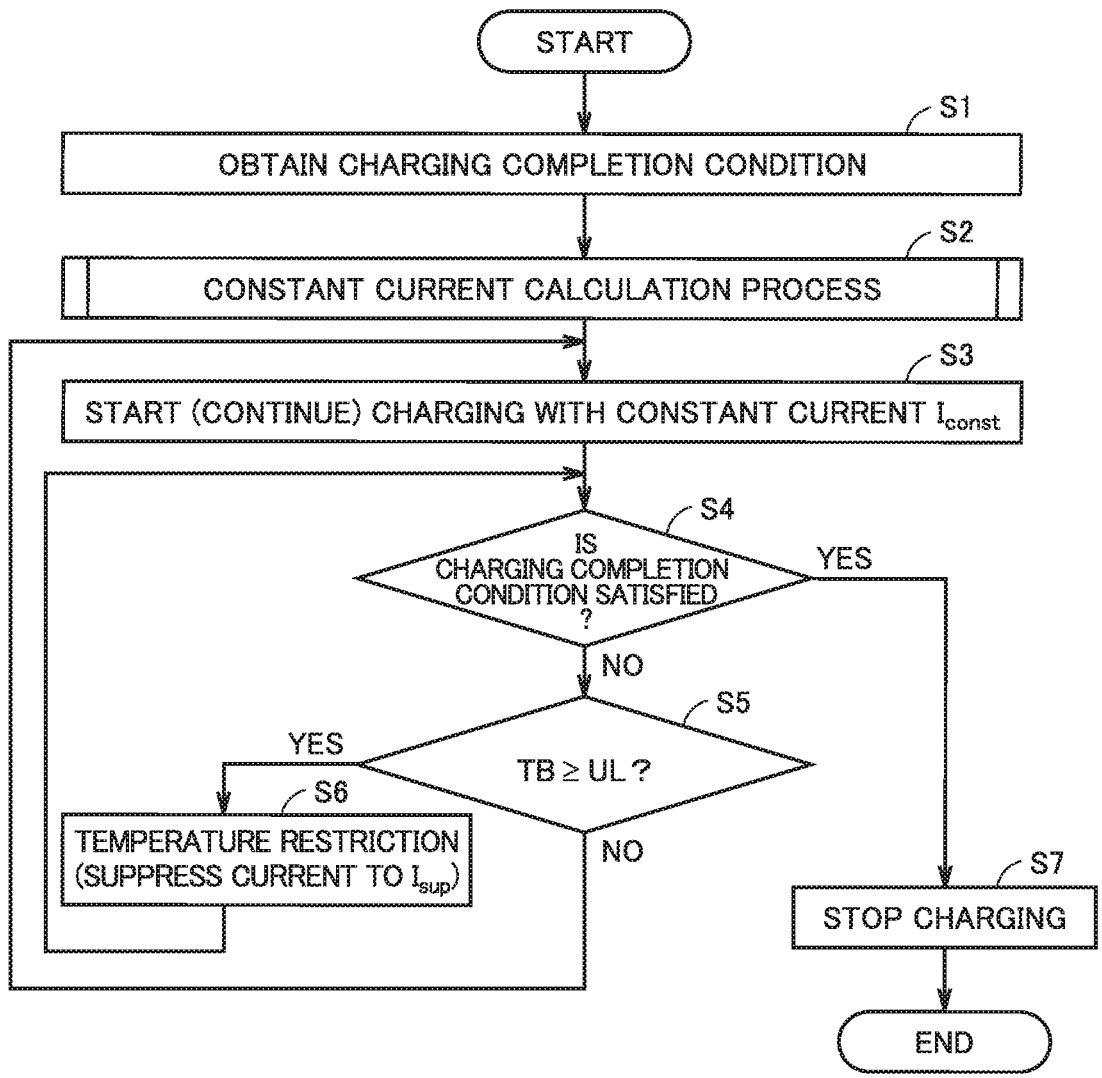
FIG. 6 is a flowchart showing the external charging control in the first embodiment.

FIG. 6 is a flowchart showing the external charging control in the first embodiment. The flowcharts shown in FIG. 6 and FIG. 9 described below are executed, for example, when the user operates operation unit 18 and performs an operation for requesting external charging of vehicle 1, with connector 31 of charging cable 3 inserted into inlet 11. Each step (hereinafter, abbreviated as "S") included in these flowcharts is basically implemented by software processing by ECU 10. However, each step may be implemented by dedicated hardware (electric circuit) formed in ECU 10.

Referring to FIG. 6, in S1, ECU 10 obtains the charging completion condition set by the user. Specifically, target value TAG of the SOC of battery 14, the amount of money that the user is ready to pay for external charging, the time (charging end time) at which the user desires to end external charging, or the like is obtained as the charging completion condition. In the case where target value TAG is set by the user, the charging completion condition is satisfied when the SOC of battery 14 reaches target value TAG. In the case where the amount of money is set by the user, the charging completion condition is satisfied when a fee that increases in accordance with an amount of charging of battery 14 reaches the amount of money. In the case where the charging end time is set by the user, the charging completion condition is satisfied when the time reaches the charging end time.

In S2, ECU 10 performs a constant current calculation process for determining constant current $I_{const}$ as charging current IB supplied to battery 14.

Figure 7:
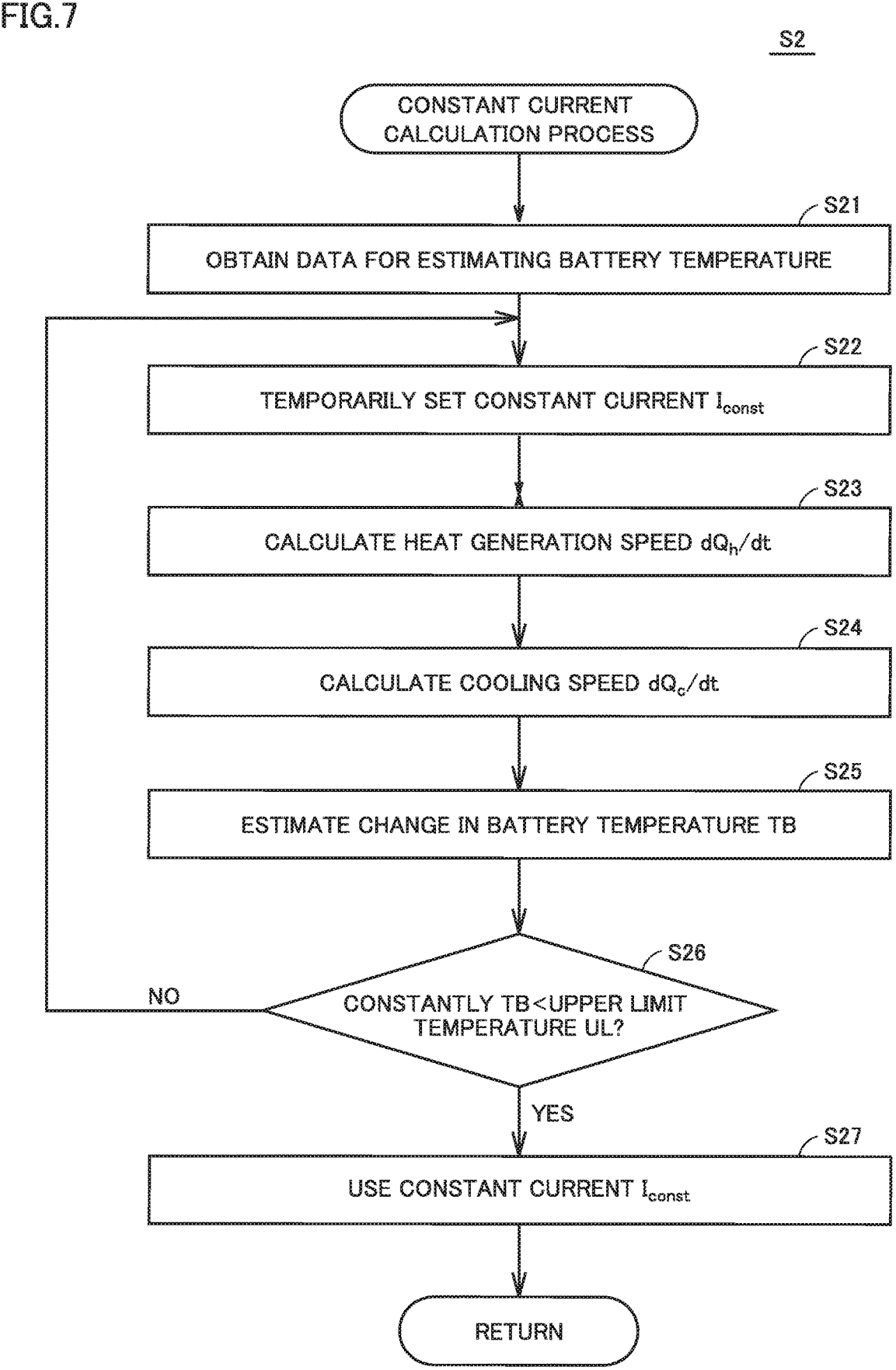
FIG. 7 is a flowchart showing a constant current calculation process in the first embodiment.

FIG. 7 is a flowchart showing the constant current calculation process in the first embodiment. Referring to FIG. 7, in S21, ECU 10 obtains various types of data for estimating a time change in battery temperature TB during external charging.

More specifically, ECU 10 calculates initial value INI of the SOC of battery 14 at this point in time (before the start of external charging). Various known methods such as a method for referring to an SOC-OCV (Open Circuit Voltage) characteristic of battery 14 can be used for calculation of the SOC.

ECU 10 also obtains battery temperature TB at this point in time (initial battery temperature $TB_{ini}$) from battery temperature sensor 143, and obtains outdoor air temperature TA at this point in time (initial outdoor air temperature $TA_{ini}$) from outdoor air temperature sensor 17.

Furthermore, ECU 10 calculates a deterioration coefficient D of battery 14 based on a use history of battery 14 (e.g., a frequency at which battery temperature TB becomes equal to or higher than a reference temperature). Deterioration coefficient D is set at a larger value as a frequency at which battery temperature TB becomes high is higher. Therefore, according to deterioration coefficient D, higher deterioration coefficient D indicates that deterioration of battery 14 progresses and the internal resistance of battery 14 increases. Instead of or in addition to the frequency at which the temperature of battery 14 becomes high, a total amount of charging and discharging of battery 14 within a prescribed time period in the past, or a frequency at which a charging and discharging current (so-called high rate current) equal to or larger than a reference value flows may, for example, be used as the use history of battery 14.

ECU 10 also obtains maximum power $W_{max}$ of charger 2 through communication with charger 2 via charging cable 3. Maximum power $W_{max}$ is used to set constant current $I_{const}$ to be smaller than maximum current $I_{max}$.

In S22. ECU 10 sets temporary constant current $I_{const}$ as an initial value of constant current $I_{const}$. For example, ECU 10 can set, as temporary constant current $I_{const}$, a sufficiently large value at which battery temperature TB can highly possibly exceed upper limit temperature UL when external charging is started with the current value. Maximum current $I_{max}$ (or a value close thereto), a predetermined fixed value, or a variable value determined in accordance with the battery temperature at this point in time (initial battery temperature $TB_{ini}$), outdoor air temperature TA and the like may, for example, be used as temporary constant current $I_{const}$.

In S23, ECU 10 calculates "heat generation speed $dQ_h/dt$" (unit: W) which is an amount of heat generation per unit time of battery 14 caused by external charging. As shown in the following equation (4), heat generation speed $dQ_h/dt$ can be calculated from current IB ($=I_{const}$) flowing through battery 14 and electrical resistance (internal resistance) $R_E$ of battery 14. The temporary value set in S22 is used as constant current $I_{const}$.

$$dQ_h/dt = I_{const}^2 \times R_E \qquad (4)$$

Electrical resistance $R_E$ depends on, for example, initial value INI of the SOC of battery 14 at this point in time (before the start of external charging), target value TAG which is the SOC of battery 14 when the charging completion condition is satisfied, battery temperature TB at this point in time (initial battery temperature $TB_{ini}$), and deterioration coefficient D. Therefore, electrical resistance $R_E$ can be calculated by using a function f indicated by the following equation (5) in which each of the above-described parameters is an argument:

$$R_E = f(IN1, TAG, TB_{ini}, D) \quad (5).$$

Function f is determined based on a result of simulation or experiment performed in advance on a battery of the same type as battery 14 under various conditions. More specifically, generally, in the battery, as the SOC becomes lower, the electrical resistance becomes higher, and as the temperature becomes lower, the electrical resistance becomes higher. In addition, as deterioration coefficient D becomes higher, the electrical resistance of battery 14 becomes higher. Such electrical resistance characteristics of battery 14 are reflected in function f. Function f may further include, as an argument, battery temperature $TB_{comp}$ when the charging completion condition is satisfied. Instead of function f, a map may be used.

In S24, ECU 10 calculates "cooling speed $dQ_c/dt$" (unit: W) which is an amount of cooling per unit time of battery 14 by air-conditioning and cooling system 15. Cooling speed $dQ_c/dt$ is obtained by dividing a temperature difference (TB−TR) between battery temperature TB and a temperature (refrigerant temperature) TR of the refrigerant flowing through air-conditioning and cooling system 15 by a thermal resistance $R_T$ of battery 14 (refer to the following equation (6)):

$$dQ_c/dt = (TB-TR)/R_T \quad (6).$$

Refrigerant temperature TR is detected by using a refrigerant temperature sensor (not shown). Thermal resistance $R_T$ can be calculated from a function g in which a surface area A (known fixed value) of battery 14, a heat transfer coefficient k of the refrigerant in air-conditioning and cooling system 15 and the like are arguments (refer to the following equation (7)):

$$R_T = g(A, k) \quad (7).$$

In S25, ECU 10 estimates a time change in battery temperature TB from this point in time to satisfaction of the charging completion condition, based on heat generation speed $Q_h$ calculated in 523 and cooling speed $Q_c$ calculated in S24. Specifically, a speed of rise (dTB/dt) in battery temperature TB (unit: K/s) can be calculated by dividing a difference ($dQ_h/dt - dQ_c/dt$) (unit: W=J/s) between heat generation speed $dQ_h/dt$ and cooling speed $dQ_c/dt$ by a heat capacity $C_{bat}$ (unit: J/K) of battery 14 (refer to the following equation (8)). Therefore, the transition of battery temperature TB can be calculated from initial battery temperature $TB_{ini}$ and the speed of rise (dTB/dt) in battery temperature TB. Heat capacity $C_{bat}$ of battery 14 is known from the specifications of battery 14 and is stored in memory 102 of ECU 10.

$$dTB/dt = (dQ_h/dt - dQ_c/dt)/C_{bat} \quad (8)$$

In S26, ECU 10 determines whether or not the estimated value of battery temperature TB in S25 is constantly equal to or lower than upper limit temperature UL during the charging period from this point in time to satisfaction of the charging completion condition. When there exists the time at which battery temperature TB exceeds upper limit temperature UL (NO in S26), ECU 10 returns the process to S22 and again sets temporary constant current $I_{const}$. At this time, in order to reduce heat generation speed $Q_h$ as compared with heat generation speed $Q_h$ in the previous time, ECU 10 sets constant current $I_{const}(n)$ in this time at a value smaller by a prescribed amount $\Delta I$ (>0) than the value set in the previous process in S22 (denoted as $I_{const}(n-1)$), for example (refer to the following equation (9)). n is a natural number indicating the number of times of execution of the iterative operation process in S22 to S26.

$$I_{const}(n) = I_{const}(n-1) - \Delta I \quad (9)$$

By repeatedly executing the process in S22 to S26, battery temperature TB can be constantly equal to or lower than upper limit temperature UL during the charging period and constant current $I_{const}$ having a largest possible value can be obtained. ECU 10 uses constant current $I_{const}$ obtained as a result of convergence of the process in S22 to S26 (S27).

As described below, the process in S24 to S26 can also be further simplified. In this simplified method, only battery temperature TB when the charging completion condition is satisfied is estimated instead of the time change in battery temperature TB from this point in time (start of charging) to satisfaction of the charging completion condition. This is because battery temperature TB during the charging period is basically considered to rise monotonously.

More specifically, first, in the process in S24, cooling speed $dQ_c/dt$ is calculated by using a function h (this may be a map) in which initial outdoor air temperature $TA_{ini}$, and set temperature $T_{set}$ and vehicle cabin temperature $T_{cab}$ of air-conditioning and cooling system 15 are arguments (refer to the following equation (10)). Function h is determined based on a result of simulation or experiment performed in advance on a battery of the same type as battery 14. Only one or two of the above-described three arguments may be used.

$$dQ_c/dt \rightarrow h(TA_{ini}, T_{set}, T_{cab}) \quad (10)$$

In the above-described equation (5), cooling speed $dQ_c/dt$ is a variable value that depends on battery temperature TB. Therefore, in calculating the time change (dTB/dt) in battery temperature TB by substituting the equation (5) into the above-described equation (8), it is required to recursively calculate battery temperature TB in a chronological order. In contrast, cooling speed $dQ_c/dt$ calculated from the equation (8) is a constant value. Therefore, the speed of rise (dTB/dt) in battery temperature TB calculated by substituting, the above-described equation (10), instead of the equation (5), into the equation (8) is also constant.

In the simplified method, charging time T from the start of charging to satisfaction of the charging completion condition is further calculated. Specifically, when target value TAG of the SOC is set by the user, the time required to charge an amount of electric power (unit: kWh) corresponding to a difference (TAG−INI) between target value TAG and initial value INI of the SOC with constant current $I_{const}$ (value set in S22) is calculated as charging time T. When the charging completion time is specified by the user (in the case of timer charging), the time from the start of charging to the completion of charging is calculated as charging time T.

Battery temperature TB after charging time T elapses from the start of charging can be estimated by using initial battery temperature $TB_{ini}$, the speed of rise (dTB/dt) in battery temperature TB approximated to a fixed value, and charging time T (S25). In the process in S26, it may be determined whether or not battery temperature TB estimated as described above is equal to or lower than upper limit temperature UL.

Returning to FIG. 6, in S3, ECU 10 starts external charging with constant current $I_{const}$ calculated by the constant current calculation process in S2.

In S4, ECU 10 determines whether or not the charging, completion condition obtained in Si is satisfied. When the charging completion condition is not satisfied (NO in S4), ECU 10 determines whether or not battery temperature TB exceeds upper limit temperature UL (S5).

When battery temperature TB exceeds upper limit temperature UL (YES in S5), ECU 10 moves the process to S6 and suppresses charging current IB supplied to battery 14 (temperature restriction). Namely, ECU 10 changes charging current IB to suppressing current $I_{sup}$ smaller than constant current $I_{const}$ calculated by the constant current calculation process. Thereafter, the process is returned to S4 and external charging with suppressing current $I_{sup}$ is continued until the charging completion condition, is satisfied. However, in the present embodiment, battery temperature TB exceeds upper limit temperature UL and temperature restriction is imposed only in a limited case such as a case in which outdoor air temperature TA rises beyond expectation.

When battery temperature TB is equal to or lower than upper limit temperature UL in S5 (NO in S5), ECU 10 returns the process to S3 and continues external charging with constant current. $I_{const}$ calculated by the constant current calculation process. As a result, unless battery temperature TB exceeds upper limit temperature UL, external charging with constant current $I_{const}$ is performed until the charging completion condition is satisfied. When the charging completion condition is satisfied (YES in S4), external charging is stopped (S7) and a series of process ends.

Although not shown, in order to avoid a sudden change in charging current IR, charging current IB may be decreased linearly, in a curved manner or in stages and charging may be stopped (S7) after the charging completion condition is satisfied (YES in S4). Alternatively, charging with a very small current (so-called push-in charging) may be performed until charging is stopped. That is, after the charging completion condition is satisfied, charging current IB does not need to be set at 0 immediately and charging with a current smaller than constant current $I_{const}$ may be continued.

As described above, in the first embodiment, by the process in S22 to S26, the largest possible current value, of the current values at which battery temperature TB can be constantly maintained to be equal to or lower than upper limit temperature UL until the charging completion condition is satisfied, is set as constant current $I_{const}$. By permitting a rise in battery temperature TB to a temperature (UL−$TB_{mgn}$) close to upper limit temperature UL, the charging time can be shortened. In addition, by performing external charging using constant current $I_{const}$ as charging current IB, the total amount of heat generation during the charging period can be reduced, as compared with the case of switching charging current 1B to suppressing current $I_{sup}$ during charging. Therefore, according to the first embodiment, it is possible to shorten the charging time as much as possible and reduce the power loss caused by external charging.

The present embodiment has been described in connection with the example in which charging current IB supplied to battery 14 is controlled to constant current $I_{const}$ which is fixed. However, ECU 10 may control the external charging operation based on charging power W (=IB×VB) supplied to battery 14 and control charging power W to a fixed, value $W_{const}$. In this case, the following equation (11), instead of the above-described equation (4), can be used to calculate heat generation speed $dQ_H/dt$:

$$dQ_H/dt = W_{const}^2/VB^2 \times R_E \quad (11).$$

Although not shown, constant power $W_{const}$ is smaller than maximum power $W_{max}$ that can be output from charger 2, and is larger than a suppressing power $W_{sup}$ that can suppress the rise in battery temperature TB by balancing heat generation speed $dQ_H/dt$ of battery 14 caused by external charging and cooling, speed $dQ_c/dt$ of battery 14 by air-conditioning and cooling system 15 ($W_{sup} < W_{const} < W_{max}$).

Modification of First Embodiment

In a modification of the first embodiment, a process of switching cooling speed $Q_c$ of battery 14 in the constant current calculation process in accordance with whether or not air-conditioning of the vehicle cabin is performed will be described. An overall flow of external charging control in the modification of the first embodiment is common to the overall flow in the first embodiment (see FIG. 6).

Figure 8:
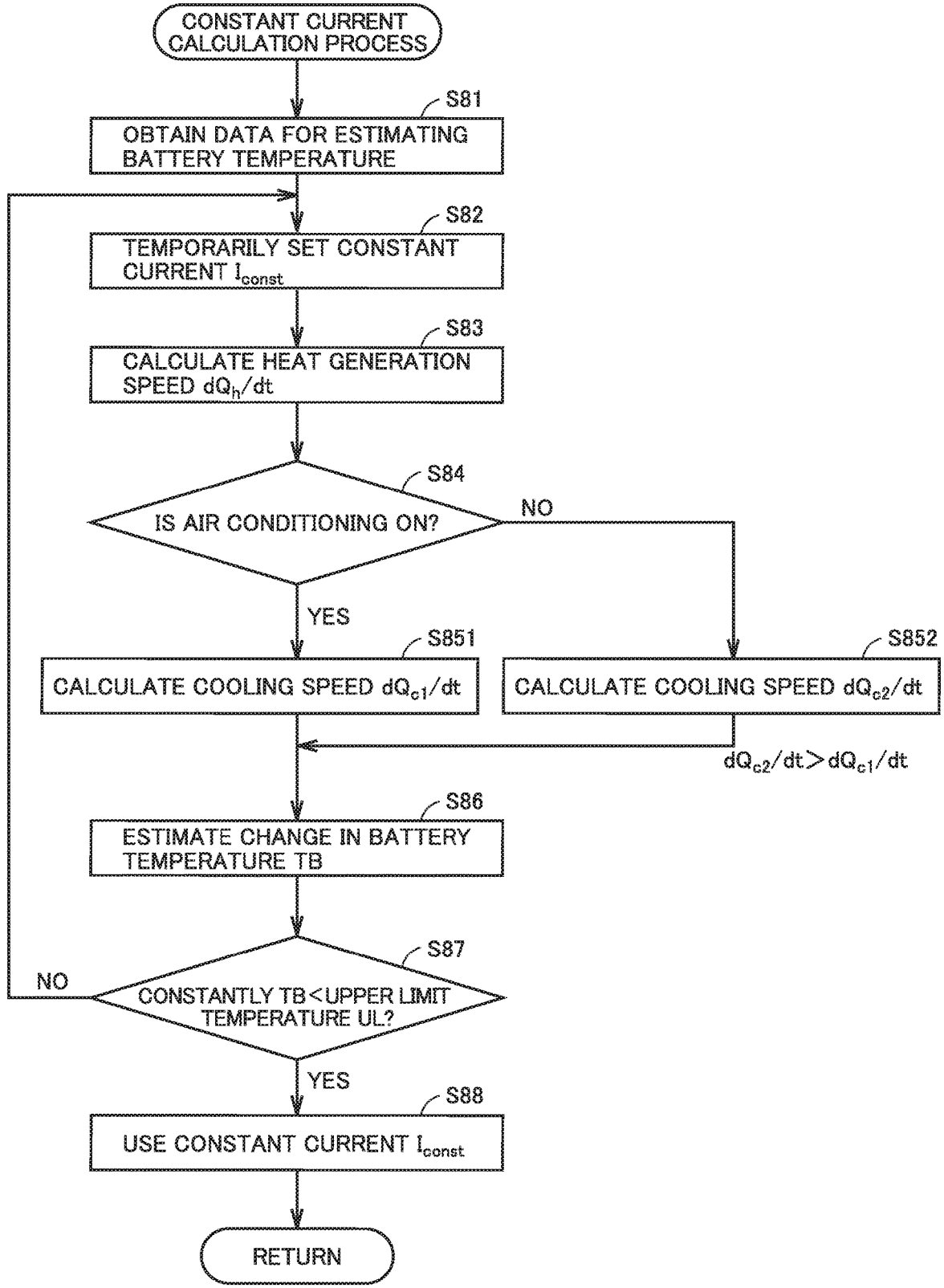
FIG. 8 is a flowchart showing a constant current calculation process in a modification of the first embodiment.

FIG. 8 is a flowchart showing a constant current calculation process in the modification of the first embodiment. Referring to FIG. 8, the process in S81 to S83 is the same as the process in S21 to S23 in the first embodiment, respectively.

In S84, ECU 10 determines whether or not air-conditioning (cooling operation) of the vehicle cabin is performed. When the cooling operation is performed (YES in S84), ECU 10 calculates $Q_{c1}$ as the cooling speed of battery 14 by air-conditioning and cooling system 15 (S851). In contrast, when the cooling operation is not performed (NO in S84), ECU 10 calculates $Q_{c2}$ different from $Q_{c1}$ as the cooling speed of battery 14 by air-conditioning and cooling system 15 (S852).

Specifically, as described in the first embodiment (the equation (5) and the equation (6) described above), thermal resistance $R_T$ is used to calculate cooling speed $Q_c$, and heat transfer coefficient k of the refrigerant flowing through air-conditioning and cooling system 15 is used to calculate thermal resistance $R_T$. Heat transfer coefficient k can vary depending on, a flowing state (a flow rate or a flow velocity) of the refrigerant.

In the configuration of air-conditioning and cooling system 15 shown in FIG. 3, the refrigerant circulating through air-conditioning and cooling system 15 is divided into the refrigerant flowing through refrigerant passage 74 and used for air-conditioning of the vehicle cabin and the refrigerant flowing through refrigerant passage 81 and used for cooling of battery 14. In air-conditioning and cooling system 15, a ratio between a flow rate of the refrigerant used for air-conditioning and a flow rate of the refrigerant used for battery cooling can be controlled by the operation of switching valves 84 and 86 and flow rate adjusting valve 64.

The ratio of the flow rate of the refrigerant used for battery cooling is lower and the heat transfer coefficient of the refrigerant is lower when the cooling operation by air-conditioning and cooling system 15 is performed than when the cooling operation by air-conditioning and cooling system 15 is not performed. A heat transfer coefficient at this time is denoted as $k_1$ and a thermal resistance of battery 14 at this time is denoted as $R_{T1}$. Then, cooling speed $Q_{c1}$ of battery 14 when the cooling operation is performed is expressed like the following equation (12):

$$dQ_{c1}/dt = (TB-TR)/R_{T1} = (TB-TR)/g(A, k_1) \quad (12).$$

When the cooling operation by air-conditioning and cooling system 15 is not performed, the flow rate of the refrigerant used for battery cooling can be made relatively higher in order to focus on battery cooling, and thus, the heat transfer coefficient of the refrigerant be higher. A heat transfer coefficient at this time is denoted as k2 and a thermal resistance of battery 14 at this time is denoted as $R_{T2}$. Then, cooling speed $Q_{c2}$ of battery 14 when the cooling operation is not performed is calculated from the following equation (13):

$$dQ_{c2}/dt=(TB-TR)/R_{T2}=(TB-TR)/g(A, k_2) \quad (13).$$

Since $k_2 > k_1$, $R_{T2} < R_{T1}$, and cooling speed $dQ_{c2}/dt$ when the cooling operation is not performed is higher than cooling speed $dQ_{c1}/dt$ when the cooling operation is performed ($dQ_{c2}/dt > dQ_{c1}/dt$). As a result, when the cooling operation is not performed, the charging time is shortened, as compared with when the cooling operation is performed. Since the subsequent process in S86 to S88 is the same as the process in S25 to S27 in the first embodiment, respectively, detailed description will not be repeated.

In the modification of the first embodiment as well, it is possible to shorten the charging time as much as possible and reduce the power loss caused by external charging, similarly to the first embodiment. Furthermore, according to the modification of the first embodiment, constant current $I_{const}$ is calculated in consideration of the fact that the capability of cooling battery 14 by air-conditioning and cooling system 15 is higher when the cooling operation is not performed than when the cooling operation is performed, and thus, it is possible to further shorten the charging time as compared with the first embodiment.

Second Embodiment

In a second embodiment, a configuration in which vehicle 1 has a plurality of (specifically, three) charging modes that can be selected by the user will be described. The three charging modes are a normal mode, a long-life mode for preventing deterioration of battery 14 and extending the life of battery 14, and a time reduction mode for further shortening the charging, time of battery 14. A configuration of the vehicle in the second embodiment is the same as the configuration of vehicle 1 in the first embodiment (see FIGS. 1 to 3).

Figure 9:
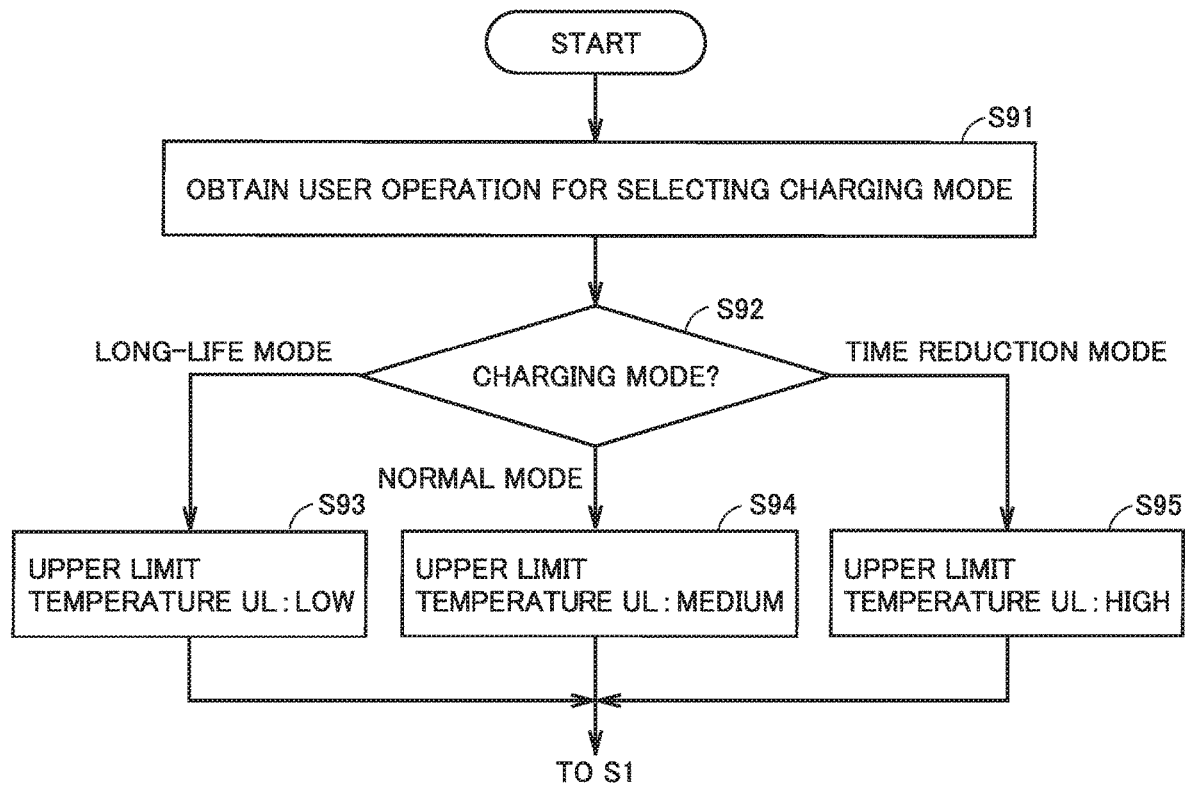
FIG. 9 is a flowchart showing external charging control in a second embodiment.

FIG. 9 is a flowchart showing external charging control in the second embodiment. Referring to FIG. 9, similarly to the flowchart shown in FIG. 6 in the first embodiment, this flowchart is executed when the user operates operation unit 18 and performs an operation for requesting external charging of vehicle 1, with connector 31 of charging cable 3 inserted into inlet 11.

Referring to FIG. 9, in S91, ECU 10 obtains a user operation for selecting one of the three charging modes.

When the normal mode is selected by the user ("normal mode" in S92). ECU 10 sets upper limit temperature UL at a medium temperature among the three charging modes (S94). It may also be determined that the normal mode is selected, when the time elapses without the user operation for selecting the charging mode.

When the long-life mode is selected by the user ("long-life mode" in S92), ECU 10 sets upper limit temperature UL at the lowest temperature among the three charging modes (S93).

When the time reduction mode is selected by the user ("time reduction mode" in S92), ECU 10 sets upper limit temperature UL at the highest temperature among the three charging modes (S95).

After upper limit temperature UL is set, the process proceeds to S1 of the flowchart in the first embodiment (see FIG. 6). The subsequent process is the same as that in the first embodiment (see FIGS. 6 and 7).

Figure 10:
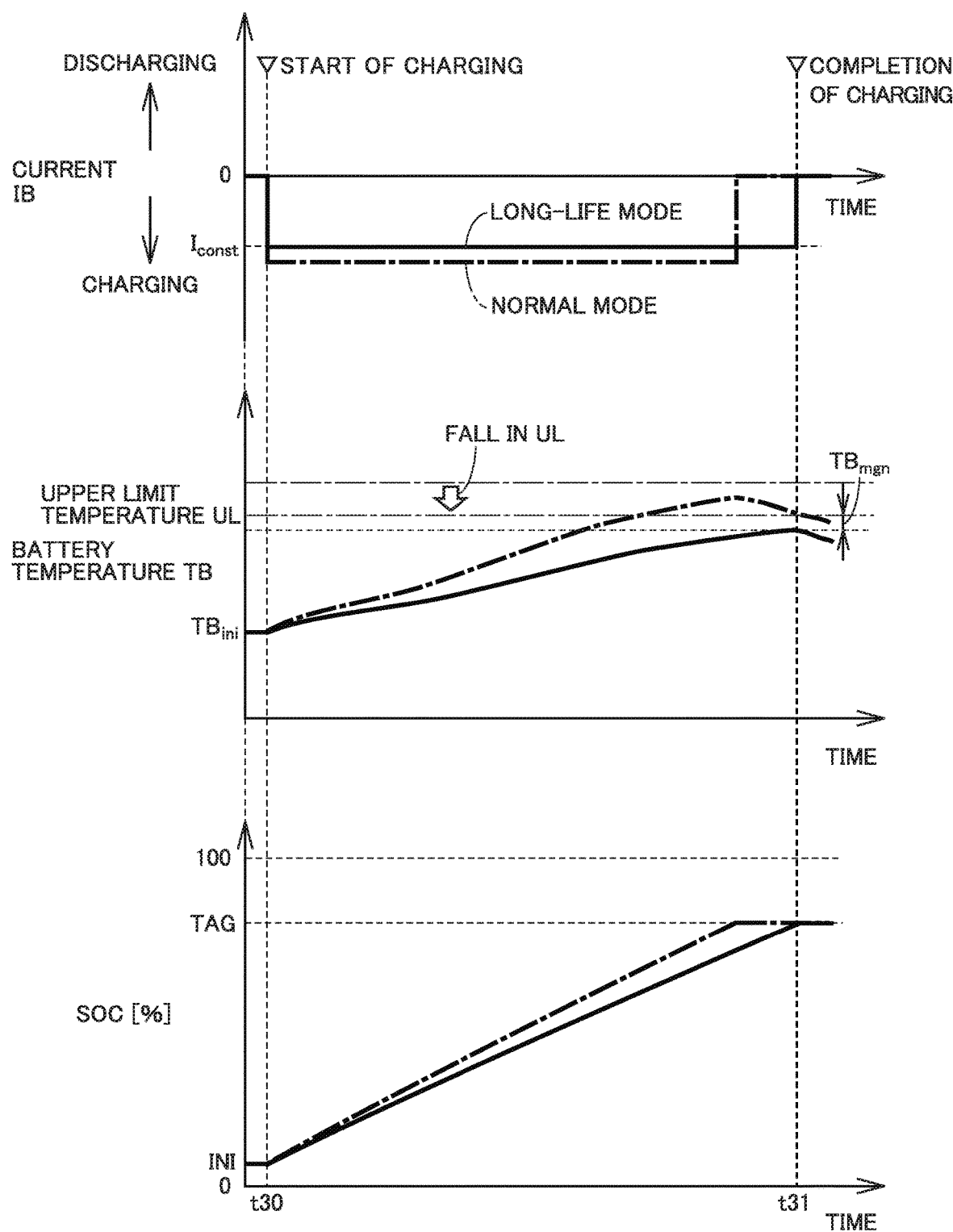
FIG. 10 is a time chart showing the external charging control in a long-life mode.
Figure 11:
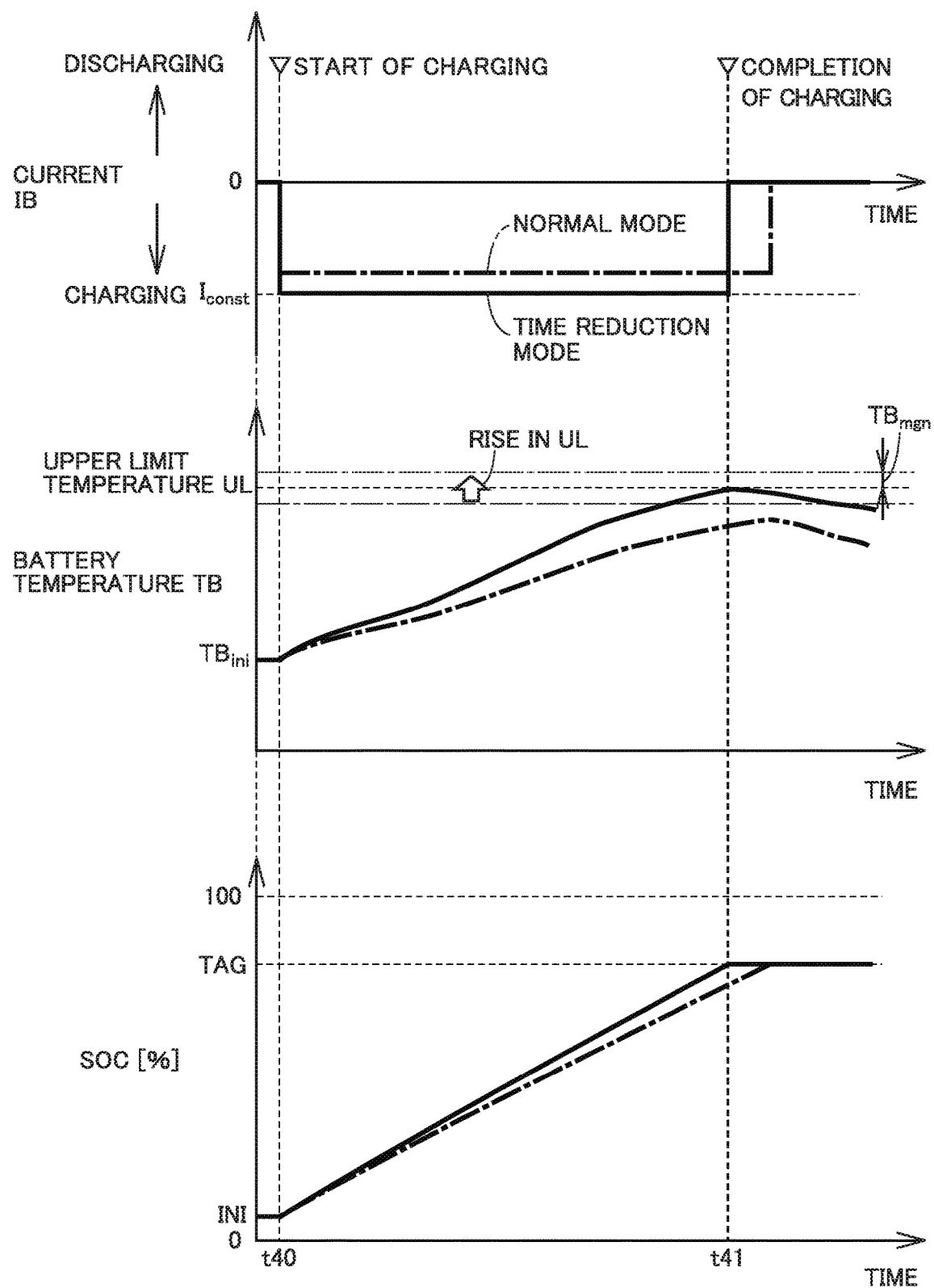
FIG. 11 is a time chart showing the external charging control in a time reduction mode.

FIG. 10 is a time chart showing the external charging control in the long-life mode. In FIG. 10 and FIG. 11 described below, a time change in each of constant current $I_{const}$, battery temperature TB and the SOC in the normal mode is indicated by an alternate long and short dash line, for the sake of comparison.

Referring to FIG. 10, upper limit temperature UL is set to be lower in the long-life mode than in the normal mode. In this case, in order to prevent battery temperature TB from exceeding upper limit temperature UL, it is required to reduce the speed of rise (dTB/dt) in battery temperature TB. In order to do so, it is necessary to reduce heat generation speed $Q_h$, and thus, constant current $I_{const}$ (absolute value thereof) is set to be small.

As battery temperature TB becomes higher, deterioration of battery 14 becomes more likely to progress. Therefore, in the long-life mode, upper limit temperature UL is set to be lower to thereby prevent battery temperature TB from reaching a high temperature, and thus, deterioration of battery 14 can become less likely to progress. As a result, shortening of the life of battery 14 caused by external charging can be suppressed, although the charging time may be relatively longer.

FIG. 11 is a time chart showing the external charging control in the time reduction mode. Referring to FIG. 11, upper limit temperature UL is set to be higher in the time reduction mode than in the normal mode. In this case, a margin (temperature rise width) of battery temperature TB rising from initial battery temperature $TB_{ini}$ to upper limit temperature UL is large, and thus, the speed of rise (dTB/dt) in battery temperature TB can be increased. Therefore, heat generation speed $Q_h$ can be increased and constant current $I_{const}$ (absolute value thereof) is set to be large.

The charging time can be further shortened in the time reduction mode than in the normal mode. In addition to chargers having a system of being charged in accordance with an amount of electric power (amount of charging) supplied from the chargers (usage-based charging system), there exist chargers having, a system of being charged in accordance with the use time (charging time) of the chargers (time-based charging system). When charger 2 has the time-based charging system, the user selects the time reduction mode, and thus, the charging time can be shortened and the charging fee can also be reduced.

As described above, according to the second embodiment, even when any of the three charging modes is selected, it is possible to shorten the charging time as much as possible and reduce the power loss caused by external charging, similarly to the first embodiment. When the long-life mode is selected from the three charging modes, shortening of the life of battery 14 caused by external charging can be suppressed. When the time reduction mode is selected, the charging time of battery 14 can be further shortened.

In the second embodiment as well, control with constant power $W_{const}$ can be performed, instead of the control with constant current $I_{const}$, similarly to the first embodiment. In addition, in each charging mode, the cooling speed in the constant current calculation process can be switched between $Q_{c1}$ and $Q_{c2}$ in accordance with whether or not air-conditioning of the vehicle cabin is performed, similarly to the modification of the first embodiment.

While the embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A vehicle comprising:
a power storage device that is chargeable with electric power supplied from an external power supply provided outside the vehicle;
a cooling device that cools the power storage device; and
a controller that controls a charging operation for the power storage device such that the power storage device is charged under a charging condition of a constant current or a constant power over a charging period from start of charging to satisfaction of a completion condition, wherein
the controller sets the charging condition such that a temperature of the power storage device when the completion condition is satisfied becomes an upper limit temperature, based on an amount of heat generation in the power storage device caused by charging and an amount of cooling of the power storage device by the cooling device,
the vehicle has a plurality of charging modes selectable by a user of the vehicle, the plurality of charging modes including a first mode and a second mode, and
when the first mode is selected by the user, the controller sets the constant current or the constant power and the upper limit temperature to be lower compared to when the second mode is selected by the user, wherein
the cooling device performs an air-conditioning operation for a vehicle cabin of the vehicle, in addition to cooling of the power storage device, and
the controller calculates the amount of cooling of the power storage device to be larger, thereby setting the constant current or the constant power to be larger, when the air-conditioning operation by the cooling device is not performed than when the air-conditioning operation by the cooling device is performed.

* * * * *